United States Patent
Crawford

[15] 3,659,268
[45] Apr. 25, 1972

[54] VEHICLE DECELERATION WARNING APPARATUS

[72] Inventor: Henry Crawford, 1560 Bermuda Place, Cincinnati, Ohio 45231

[22] Filed: May 18, 1970

[21] Appl. No.: 37,974

[52] U.S. Cl............................340/71, 340/262, 200/61.45
[51] Int. Cl.........................................................B60q 1/44
[58] Field of Search ...........................340/71, 72, 66, 262; 200/61.45

[56] References Cited

UNITED STATES PATENTS 2,420,351  5/1947  Brown..................................340/262
3,359,540  12/1967  Dunavan..............................340/72
3,057,976  10/1962  Weaver...........................340/71 UX Primary Examiner—Alvin H. Waring
Attorney—Kinney and Schenk

[57] ABSTRACT

A deceleration warning apparatus to provide a deceleration signal is disclosed. The deceleration warning apparatus includes a deceleration responsive switch which will complete an electrical circuit to actuate a signal in response to actual or intended deceleration in excess of a preset speed differential range.

9 Claims, 2 Drawing Figures

PATENTED APR 25 1972

3,659,268

INVENTOR.
HENRY CRAWFORD

BY Kinney and Schenk

ATTORNEYS 3,659,268

VEHICLE DECELERATION WARNING APPARATUS

BACKGROUND OF THE INVENTION

This invention relates generally to deceleration responsive apparatus and more particularly to a deceleration warning apparatus for use on any vehicle capable of accelerating and decelerating.

When a person is operating a motor vehicle such as an automobile, it would be advantageous to know whether the vehicle immediately in front of you is decelerating rather than accelerating or maintaining its speed. From a safety standpoint, an advance warning or knowledge of this fact would be highly advantageous. In these days of high intensity freeway travel, it is not infrequent to read about massive rear end collisions involving anywhere from 10 or more automobiles. These accidents generally occur because the first car suddenly decelerates for a reason the cars immediately behind cannot see or know. The cars behind the lead car have no advance warning and continue at their present speed or even accelerate until they see the flash of the stoplights on the car immediately preceding them. If a driver of an automobile had a warning that the car immediately in front of his has started to decelerate, i.e., the driver has removed his foot from the accelerator pedal, this slight advance knowledge prior to the coming on of the brake lights might prevent an accident. At the present time, there is no such advance warning light or system available. The only warning of a deceleration of the vehicle in front of you is the flash of the stoplights.

Accordingly, it is an object of this invention to provide a vehicle deceleration warning apparatus which will provide an advance warning to following vehicles that the operator of the first vehicle has started to decelerate.

A further object of this invention is to provide a warning system having a signal means and being responsive to deceleration forces.

Yet another object of this invention is to provide a switch member attachable to a part of the accelerator pedal linkage wherein deceleration of the vehicle is anticipated by reaction to the accelerator pedal.

SUMMARY OF THE INVENTION

This invention provides a deceleration warning apparatus for installation on vehicles. The warning apparatus is of simple and economical construction and provides an indication of the vehicle's actual deceleration or the operator's intention to decelerate. The invention comprises a switch mechanism which is connected to the accelerator linkage and is responsive to movements of the accelerator linkage, as well as deceleration forces which override the condition established by the accelerator linkage. The switch mechanism completes an electrical circuit to provide a signal indicating actual or an intent to decelerate.

Other details, uses, and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF THE ILLUSTRATED EMBODIMENT

Figure 1:
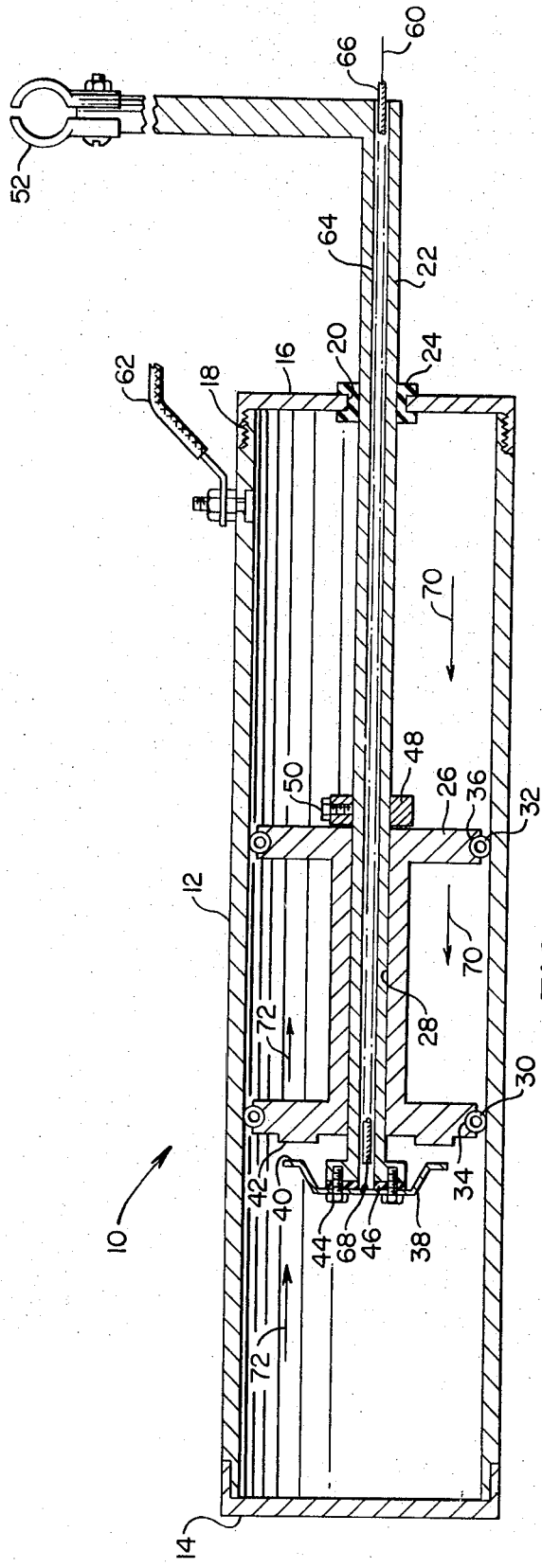
FIG. 1 is a cross-sectional view illustrating one exemplary embodiment of the switch assembly of this invention.
Figure 2:
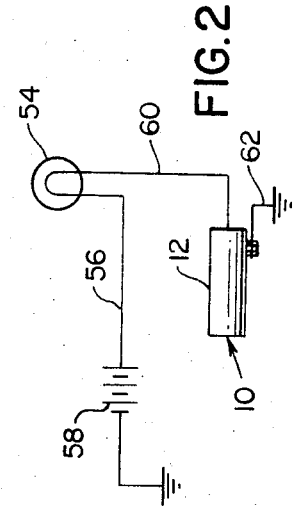
FIG. 2 is a diagrammatic illustration of a warning system incorporating the deceleration warning apparatus of this invention.

Reference is now made to FIG. 1 which illustrates one exemplary embodiment of the deceleration warning apparatus of this invention, which is designated generally by the reference numeral 10. The deceleration warning apparatus is comprised of switch mechanism having an outer housing 12. A deceleration warning system comprising the apparatus of this invention is schematically shown in FIG. 2. It is seen that a signal means, such as a light 54, is connected by lead line 56 to the battery 58. The light 54 is connected by lead line 60 to the switch apparatus 10. The housing 12 is connected to ground by lead line 62 which is secured to the housing 12 by conventional means. As will be explained more fully below, the light 54 is energized when there is a complete circuit between lines 60 and 62 through the switch apparatus 10. The light 54 is mounted at the rear of the vehicle and is preferably of an amber color so as to be distinguishable from the stoplights.

The housing 12 is preferably of a cylindrical form having an end cap 14 affixed to one end and an end cap 16 removably attached to the other end of the cylindrical housing 12 by any suitable means such as cooperating threads 18. The cap 16 has an aperture 20 formed therein through which a rod 22 is inserted. A bushing 24 is fitted in aperture 20 and is in sealing engagement with the rod 22. The purpose of the bushing 24 is to prevent moisture from entering the interior of the housing 12.

Mounted within the housing 12 is a piston 26 having a bore 28 extending therethrough. The rod 22 extends through the bore 28 so that the piston 26 may slide therealong. Spring pressure rings 30 and 32 are mounted in cooperatively formed grooves 34 and 36 formed in each end of the piston 26. The rings 30 and 32 provide a sliding contact between the piston 26 and housing 12.

At the end of rod 22 there is mounted a contact member 38. The contact member 38 may be any configuration, such as a concentric ring or it may be a split member, so long as a contact point or surface 40 will make contact with a corresponding contact surface 42 formed at one end of the piston 26. The contact member 38 is electrically isolated from the rod 22 by the use of insulated screws 44 and a dielectric material 46 placed between the contact member 38 and the end of rod 22.

The maximum axial distance of the gap between contact points 40 and 42 may be set through the use of an adjustment element 48, such as a ring or nut, which is secured to the rod 22 by any suitable means such as set screw 50. The distance of the gap determines the speed differential range through which the switch apparatus operates.

The other end of the rod 22 is secured by any suitable means such as a clamp 52 to any movable portion of the accelerator linkage or train. In other words, the rod 22 may be attached anywhere from the gas pedal through the linkage to the carburetor. Thus, when the accelerator is depressed to increase the speed of the vehicle, the rod 22 will be moved axially in the direction of arrows 70 toward the end cap 14 of the housing 12.

The line 60 extends from one terminal of the light 54 and through a bore 64 which extends the length of rod 22. It is seen that the line 60 has an insulated covering 66 thereon which ends a short distance from the contact member 38. The line 60 is connected to the contact member 38 at a point 68 by any suitable means such as soldering. The rod 22, piston 26, rings 30 and 32, and housing 12 are all made of a conductive material. Thus, when there is electrical continuity between line 60, contact member 38, piston 26, rings 30 and 32, housing 12 and ground line 62, the circuit is complete and the light 54 is actuated. In other words, when the contact member 38 engages the piston 26, the circuit will be complete and the light 54 will be on.

In some instances it may be desirable to complete the circuit from the piston 26 through the rod 22 to clamp 52 to ground. In these cases, the rings 30 and 32 and the housing 12 may be made of non-conducting material.

The housing 12 is mounted on the vehicle so that it is in axial alignment with the direction of movement of the vehicle and the rod 22 is connected by the clamp 52 to a portion of the accelerator train. Thus, when the accelerator is depressed to provide vehicle acceleration, the rod 22 moves axially relative to the housing 12 in the direction of arrows 70. The ring 48, securely attached to rod 22, engages piston 26 and urges the piston in the direction of the arrows 70.

During the initial accelerating stage and when the desired speed has been reached and the accelerator pedal is maintained at a constant position to maintain the desired speed, a gap between contact surfaces 40 and 42 will exist and the light 54 is off. This gap is the speed differential range and this range may be adjusted by the adjustment of the ring 48 along the rod 22. Thus, if the gap is set to provide a speed differential range of 10 miles per hour, contact between surfaces 40 and 42 will not be made until either the rod 22 moves in the direction of arrows 72 or the piston 26 moves in the direction of the arrows 70 due to inertia forces acting thereon a distance equivalent to the speed differential range of 10 miles per hour. When contact is made between surfaces 40 and 42, the electrical circuit is complete and light 54 will be energized to indicate an actual or intended deceleration.

As an example, if the speed differential range is 10 mph and the vehicle has reached and is maintaining a speed of 70 mph, the gap as shown in FIG. 1 will be present. If the speed of the vehicle decreases to 61 mph, the rod 22 will have moved in the direction of arrows 72 but a slight gap will still exist between surfaces 40 and 42, assuming that this has been a gradual decrease in speed and the accelerator pedal has only been slightly let up to the 61 mph position. If the accelerator pedal is further released so that the vehicle speed drops to 60 mph or below, the surfaces 40 and 42 will make contact and the light 54 will come on and remain on until the rod 22 is moved in the direction of arrows 70 sufficiently to break the contact between surfaces 40 and 42. However, if the operator of the vehicle, rather than decreasing further from 61 mph, accelerates to 75 mph the existing gap will continue. However, the speed differential range will now be changed to exist between 75 mph and 65 mph. Hence, if the vehicle decelerates from 75 to 64 mph, the light will be energized.

Another example of the use of the invention is when the vehicle operator decides to decelerate his vehicle and removes his foot from the accelerator. As soon as the foot is removed from the accelerator pedal, the rod 22 moves in the direction of the arrows 72 and the contact element 38 immediately engages the piston 26. The vehicle may still by traveling at 70 mph, i.e., the upper limit of the speed differential range for example, yet the light 54 will come on. Hence, an advance indication of the vehicle's impending deceleration is given because of the reaction of the rod 22 to the accelerator pedal linkage.

The light 54 will also be energized in the case of a "panic" stop in which the operator still has his foot engaging the accelerator but has additionally depressed the brake to overcome the accelerating force. In this condition, the piston 26, because of the inertia force acting thereon, will slide in the direction of the arrows 70 to make contact with surface 40 of the contact member 38 causing the light 54 to go on. Should the brake light be on but the light 54 off, assuming the light 54 is in operating condition, this would indicate that the vehicle is not decelerating, as indicated by the brake lights. This might be the case when a person is resting his foot on the brake pedal just enough to cause the brake lights to be energized without causing a braking action of the vehicle.

The deceleration warning apparatus hereinabove described has been specifically described for use with the indicating signal at the rear of the vehicle to provide a visual indication to a following vehicle. It is feasible that another indicating means may be placed at the front of the vehicle to serve the same purpose of warning about deceleration. In other words, a pedestrian would be able to observe an oncoming car to determine whether it is decelerating. In addition, a person in a vehicle which has stopped or is decelerating may be able to observe a vehicle approaching the rear of his vehicle in order to provide warning to the operator of the first vehicle to prepare himself for a jolt if the car coming up in the rear is not decelerating. It is also a possibility that an audible or visual indication might be placed in the vehicle itself to provide an indication to the operator of the vehicle.

It can be seen that with the use of the deceleration warning apparatus of this invention that a warning is provided to others of an actual or anticipated deceleration of the vehicle. Thus, this invention provides a deceleration warning apparatus which is of simple and economical construction, is easily operable and accomplishes the desired objects hereinabove set forth.

While a present exemplary embodiment of this invention has been illustrated and described, it will be recognized that this invention may be otherwise variously embodied and practiced by those skilled in the art.

What is claimed is:

1. A decelerating warning apparatus for use on accelerator controlled vehicles comprising in combination a deceleration responsive switch means having a speed differential range over which said switch means is normally in a first condition, said switch means being connected to an accelerator linkage wherein movement of the accelerator to increase vehicle speed adjusts said switch means whereby the vehicle maximum speed is the upper limit of the speed differential range, indicator means, and an electrical circuit interconnecting said indicator means and said switch means wherein said switch means being moved to a second condition in response to deceleration forces activates the circuit whereby said indicator means is energized to thereby indicate vehicle deceleration, a housing having a long axis, said switch means being mounted within said housing and said housing being mounted on a vehicle so that the long axis thereof is parallel to the direction of the vehicle, said switch means comprises a first member mounted in said housing for movement along the long axis thereof, a second member mounted in said housing for movement along the long axis thereof, said first and second members being normally spaced axially apart in the absence of deceleration forces wherein the maximum axial gap therebetween represents the speed differential range, an elongate rod extending into said housing and mounted for movement within the housing along the axis, one end of said rod being connected to the accelerator linkage, said first member being mounted on the other end of said rod, adjustment means adjustably secured to said elongate rod for engagement with said second member wherein movement of the accelerator linkage in the accelerating direction causes said rod to move along the axis of said housing whereby said adjustment means engages said second member and causes movement of said second member along the axis of the housing and thereby maintaining the maximum axial gap between said first and said second members, said elongate rod formed with an axial bore therethrough, said electrical circuit including an insulated lead extending through said axial bore and being connected to said first member wherein the electrical circuit is in a first circuit condition when any gap exists between said first and second members and said electrical circuit is in a second circuit condition when said first and second members are in contact one with the other.

2. A deceleration warning apparatus for use on accelerator controlled vehicles comprising in combination a deceleration responsive switch means having a speed differential range over which said switch means is normally in a first condition, said switch means being connected to an accelerator linkage wherein movement of the accelerator to increase vehicle speed adjusts said switch means whereby the vehicle maximum speed is the upper limit for the speed differential range, indicator means, and an electrical circuit interconnecting said indicator means and said switch means wherein said switch means being moved to a second condition in response to deceleration forces activates the circuit whereby said indicator means is energized to thereby indicate vehicle deceleration, a housing having a long axis, said switch means being mounted within said housing and said housing being mounted on a vehicle so that the long axis thereof is parallel to the direction of the vehicle, said housing comprising an elongate cylinder being closed at both ends, one end of said cylinder being formed with an aperture and further comprising an elongate rod extending through said aperture, one end of said rod being connected to the accelerator linkage, said switch means comprises a contact member secured to the other end of said rod and providing a first contact surface, and a second contact member having as axial bore therethrough, said rod extending through the bore of said second member wherein said rod can move relative to said second member, said second second member providing a second contact surface complimentary with the contact surface of said first member.

3. The warning apparatus according to claim 1 in which said first member is formed in a cuplike shape, said cuplike member having a lip providing a contact surface for engaging said second member, means for mounting said cuplike member to said other end of said rod wherein said cuplike member is electrically isolated from said rod, and the ground connection for said electrical circuit being made through said second member.

4. The warning apparatus according to claim 2 further comprising a seal means mounted in said aperture, said seal means being in sealing engagement with said elongate rod, adjustable means secured to said elongate rod for engagement with said second contact member so that an axial gap exists between the first and second contact surfaces whereby the axial gap represents the speed differential range.

5. The warning apparatus according to claim 4 in which said elongate rod is formed with an axial bore therethrough, said electrical circuit having an insulated lead line extending through the bore in said rod and being connected to said first contact member, means for electrically isolating said first contact member from said rod, contact means attached to said second member for cooperative engagement with said housing and means connecting said housing to a ground connection whereby electrical continuity exists in said electrical circuit when said first and second members are in contact one with the other.

6. The warning apparatus according to claim 5 in which said second contact member is an elongate piston-like shape being formed with an axial bore therethrough, said rod extending through the bore in said second member wherein said rod can move axially relative to said second member, and in which said means for adjusting the maximum axial gap is a nutlike member adjustably secured to said rod between said second member and the aperture end of said housing and wherein said nutlike member will engage said second contact member during acceleration of the vehicle as said rod axially moves in said housing in response to the accelerator linkage movement whereby said second contact member is also moved axially by said nutlike member and the maximum vehicle speed determines the upper limit of the speed differential range.

7. The warning apparatus according to claim 6 further comprising a seal mounted in said aperture to make sealing contact with said rod, means attached to the periphery of said piston-like second member for making sliding contact between said second member and said housing, and in which said first member is formed in a cuplike shape.

8. The warning apparatus according to claim 7 further comprising mounting means for securing said cuplike member to the other end of said rod wherein said cuplike member is electrically isolated from said rod.

9. The warning apparatus according to claim 8 in which said elongate rod is formed with an axial bore therethrough and in which said electrical circuit includes an insulated lead extending through the bore in said rod and being connected to said cuplike member wherein said electrical circuit is in a first condition when any gap exists between said first and second contact members and said electrical circuit is in a second circuit condition when said first and second contact members are in contact one with the other.

* * * * *